United States Patent
Zhao et al.

(10) Patent No.: US 9,805,847 B2
(45) Date of Patent: Oct. 31, 2017

(54) THERMISTOR MATERIAL AND METHOD OF PREPARING THE SAME

(71) Applicant: BYD Company Limited, Shenzhen (CN)

(72) Inventors: Yanshuai Zhao, Shenzhen (CN); Wei Zhou, Shenzhen (CN)

(73) Assignee: BYD Company Limited (CN)

( * ) Notice: Subject to any disclaimer, the term of this patent is extended or adjusted under 35 U.S.C. 154(b) by 164 days.

(21) Appl. No.: 14/762,078

(22) PCT Filed: Jan. 24, 2014

(86) PCT No.: PCT/CN2014/071418
§ 371 (c)(1),
(2) Date: Jul. 20, 2015

(87) PCT Pub. No.: WO2014/117689
PCT Pub. Date: Aug. 7, 2014

(65) Prior Publication Data
US 2015/0371742 A1    Dec. 24, 2015

(30) Foreign Application Priority Data

Jan. 30, 2013  (CN) .......................... 2013 1 0034876

(51) Int. Cl.
*H01B 1/02*   (2006.01)
*H01C 7/02*   (2006.01)
(Continued)

(52) U.S. Cl.
CPC ........... *H01C 7/023* (2013.01); *C01G 23/006* (2013.01); *C04B 35/462* (2013.01);
(Continued)

(58) Field of Classification Search
CPC ..................................................... C04B 35/46
(Continued)

(56) References Cited

U.S. PATENT DOCUMENTS

| 3,811,937 A | 5/1974 | Maher |
| 2003/0038704 A1 | 2/2003 | Kuzuoka et al. |
| 2012/0238438 A1 | 9/2012 | Endo et al. |

FOREIGN PATENT DOCUMENTS

| CN | 1137679 A | 12/1996 |
| CN | 1794370 A | 6/2006 |

(Continued)

OTHER PUBLICATIONS

Wang, Lijuan Study on low room temperature resistivity and high effect of the BaTiO3-based PTC function ceramic meterials China Masters' thesis Aug. 11, 2009(Aug. 11, 2009) pp. 12, 16, 18-19 and 29-32.
(Continued)

*Primary Examiner* — Khanh Tuan Nguyen
(74) *Attorney, Agent, or Firm* — Lerner, David, Littenberg, Krumholz & Mentlik, LLP

(57) ABSTRACT

A thermistor material and a method for preparing a thermistor material are provided. The thermistor material is prepared by mixing and heating a mixture containing $BaTiO_3$, $B_2O_3$, $SiO_2$, $Li_2O$, $P_2O_5$, $Cs_2O$, $Nd_2O_3$, $Al_2O_3$ and $TiO_2$.

19 Claims, 5 Drawing Sheets

(51) Int. Cl.
  *C04B 35/468* (2006.01)
  *C04B 35/626* (2006.01)
  *C04B 35/634* (2006.01)
  *C01G 23/00* (2006.01)
  *C04B 35/462* (2006.01)
  *C04B 35/64* (2006.01)
  *H01C 7/00* (2006.01)
  *H01C 17/065* (2006.01)
  *C04B 35/653* (2006.01)

(52) U.S. Cl.
  CPC ...... *C04B 35/4682* (2013.01); *C04B 35/6261* (2013.01); *C04B 35/62685* (2013.01); *C04B 35/62695* (2013.01); *C04B 35/63416* (2013.01); *C04B 35/64* (2013.01); *H01C 7/008* (2013.01); *H01C 7/025* (2013.01); *H01C 17/06533* (2013.01); *C04B 35/653* (2013.01); *C04B 2235/32* (2013.01); *C04B 2235/3201* (2013.01); *C04B 2235/3203* (2013.01); *C04B 2235/3217* (2013.01); *C04B 2235/3224* (2013.01); *C04B 2235/3232* (2013.01); *C04B 2235/3236* (2013.01); *C04B 2235/34* (2013.01); *C04B 2235/3409* (2013.01); *C04B 2235/3418* (2013.01); *C04B 2235/449* (2013.01); *C04B 2235/5427* (2013.01); *C04B 2235/6562* (2013.01); *C04B 2235/6565* (2013.01); *C04B 2235/6567* (2013.01); *C04B 2235/785* (2013.01)

(58) Field of Classification Search
  USPC ...................................................... 252/520.2
  See application file for complete search history.

(56) References Cited

FOREIGN PATENT DOCUMENTS

| | | | |
|---|---|---|---|
| CN | 101219893 | A | 7/2008 |
| CN | 102584254 | A | 7/2012 |
| EP | 1017069 | A2 | 7/2000 |
| JP | H02026866 | A | 1/1990 |
| JP | H05116943 | A | 5/1993 |
| JP | H08213206 | A | 8/1996 |
| JP | H08239215 | A | 9/1996 |
| JP | H11092234 | A | 4/1999 |
| JP | 2000313661 | A | 11/2000 |
| JP | 2005500239 | A | 1/2005 |
| JP | 2007001821 | A | 1/2007 |
| JP | 2009256179 | A | 11/2009 |

OTHER PUBLICATIONS

International Search Report and Written Opinion for Application No. PCT/CN2014/071418 dated May 9, 2014.
Supplementary European Search Report for Application No. EP14746818 dated Sep. 28, 2016.

THERMISTOR MATERIAL AND METHOD OF PREPARING THE SAME

CROSS-REFERENCE TO RELATED APPLICATION

This application is a national phase entry under 35 U.S.C. §371 of International Application No. PCT/CN2014/071418, filed Jan. 24, 2014, which claims priority from Chinese Patent Application No. 201310034876.3, filed on Jan. 30, 2013, the entire content of which is incorporated herein by reference.

FIELD

The present disclosure relates to a thermistor material and method of preparing the thermistor material.

BACKGROUND

The statements in this section merely provide background information related to the present disclosure and may not constitute prior art.

Positive temperature coefficient (PTC) thermistor, as a protection element in over-current or over-temperature condition, is widely used in computer and its peripheral equipment, mobile phone, battery pack, telecommunication equipment, network device, transformer, industrial control equipment, vehicle and other electronic products. For example, a barium titanate PTC thermistor is widely used in various industries because of its high temperature coefficient.

A traditional barium titanate PTC thermistor generally has a curie temperature of about 120 degree Celsius. Currently, in order to increase an operating temperature of the barium titanate PTC thermistor, there are many studies on semi-conduction process of barium titanate powder, for example, a donor doping or an acceptor doping may be carried out. The donor doping may be processed by using Pb, Sr, Ca, Y, Nb, Bi, Ce or La, and the acceptor doping may be processed by using Mn, Fe or Mg. However, those barium titanate PTC thermistors may have a high ambient resistance. Also, the sintering process during the semi-conduction process may be hard to control, thus the barium titanate powder may be unevenly semi-conducted. In this way, the barium titanate powders may be nonuniform, thus the barium titanate PTC thermistor may have a high grain resistance and a high grain boundary resistance. Therefore, the barium titanate PTC thermistor may have a high ambient resistance and a decreased lift-to-drag ratio, which greatly restrict its development and application.

SUMMARY

The present disclosure seeks to solve at least one of the problems existing in the prior art to at least some extent. To this end, a thermistor material and a method for preparing a thermistor material are provided.

According to an aspect of the present disclosure, a method for preparing a thermistor material is provided. The method may include steps of: providing a first mixture containing $BaTiO_3$, $B_2O_3$, $SiO_2$, $Li_2O$, $P_2O_5$, $Cs_2O$ and $Nd_2O_3$, in which with respect to 100 weight parts of the first mixture, $BaTiO_3$ is about 94.85 weight parts to about 97.75 weight parts, $B_2O_3$ is about 0.4 weight parts to about 2.5 weight parts, $SiO_2$ is about 0.5 weight parts to about 0.9 weight parts, $Li_2O$ is about 0.08 weight parts to about 0.2 weight parts, $P_2O_5$ is about 0.2 weight parts to about 0.3 weight parts, $Cs_2O$ is about 0.6 weight parts to about 0.725 weight parts, and $Nd_2O_3$ is about 0.325 weight parts to about 0.565 weight parts; sintering the first mixture at about 800 degree Celsius to about 900 degree Celsius to form a first powder material; mixing the first powder material with a second mixture comprising $Al_2O_3$ and $TiO_2$, in which with respect to 100 weight parts of $BaTiO_3$, $Al_2O_3$ is about 0.06 weight parts to about 0.08 weight parts, and $TiO_2$ is about 0.07 weight parts to about 0.08 weight parts to form a second power material; granulating, pelleting and molding the second powder material to form a molded material; and subjecting the molded material to a heat treatment.

In some embodiments, the heat treatment includes: a first heat treatment at a first temperature of about 580 degree Celsius to about 600 degree Celsius; a second heat treatment at a second temperature of about 1150 degree Celsius to about 1180 degree Celsius; a third heat treatment at a third temperature of about 1200 degree Celsius to about 1270 degree Celsius; and a fourth heat treatment at a fourth temperature of about 1100 degree Celsius to about 1175 degree Celsius.

According to another aspect of the present disclosure, a thermistor material prepared by the method mentioned above is provided.

The inventors have surprisingly found that, with the method according to embodiments of the present disclosure, the prepared thermistor material may be doped with various oxides ($BaTiO_3$, $B_2O_3$, $SiO_2$, $Li_2O$, $P_2O_5$, $Cs_2O$, $Nd_2O_3$, $Al_2O_3$ and $TiO_2$). Then a curie temperature, a voltage resistance, and a lift-to-drag ratio of the thermistor material may be increased, and an ambient resistance, a grain resistance and a grain boundary resistance of the thermistor material may be reduced. In addition, the method according to embodiments of the present disclosure may be simple to operate, has low requirements on the sintering condition (for example, the sintering step has good sintering condition and is easy to control) and is low in the cost. In this way, yield and uniformity of the prepared thermistor material may be improved. The thermistor material may have high positive temperature coefficient (PTC), thus the thermistor material may be also referred as PTC thermistor material.

With the method according to embodiments of the present disclosure, the barium titanate ($BaTiO_3$) may be evenly semi-conducted by a mixing doping of a donor doping and an acceptor doping. As both donor doping and acceptor doping are performed during the method, the $BaTiO_3$ powders may be even during the sintering step, and the grain resistance and grain boundary resistance may be low, thus the ambient resistance of the thermistor material may be further reduced and the lift-to-drag ratio may be improved. In addition, other performances of the thermistor material may also be improved, thus the thermistor material prepared according to embodiments of the present disclosure may be applied in various fields.

According to embodiments of the present disclosure, the prepared thermistor material may have an ambient resistance less than twenty Ohm, a working voltage higher than 400 Volts, a breakdown voltage up to 900 Volts, a curie temperature of about 200 degree Celsius, and a lift-to-drag ratio larger than 6. Therefore, the thermistor material prepared according to embodiments of the present disclosure may be applied in a high pressure and high temperature environment.

According to a further aspect of the present disclosure, a thermistor material is provided. The thermistor may be prepared by mixing and heating a mixture, in which the mixture may contain $BaTiO_3$, $B_2O_3$, $SiO_2$, $Li_2O$, $P_2O_5$, $Cs_2O$, $Nd_2O_3$, $Al_2O_3$ and $TiO_2$.

According to embodiments of the present disclosure, a curie temperature, a voltage resistance, and a lift-to-drag ratio of the thermistor material may be increased, and an ambient resistance, a grain resistance and a grain boundary resistance of the thermistor material may be reduced. In addition, the thermistor material may be easy to manufacture and low in manufacturing coat. The thermistor material may have high positive temperature coefficient (PTC), thus the thermistor material may be also referred as PTC thermistor material. In addition, other performances of the thermistor material may also be improved, thus the thermistor material prepared according to embodiments of the present disclosure may be applied in various fields.

According to embodiments of the present disclosure, the thermistor material may have an ambient resistance less than twenty Ohm, a working voltage higher than 400 Volts, a breakdown voltage up to 900 Volts, a curie temperature of about 200 degree Celsius, and a lift-to-drag ratio larger than 6. Therefore, the thermistor material may be applied in a high pressure and high temperature environment.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the present disclosure will become apparent and more readily appreciated from the following descriptions taken in conjunction with the drawing, in which.

DETAILED DESCRIPTION

Figure 1:
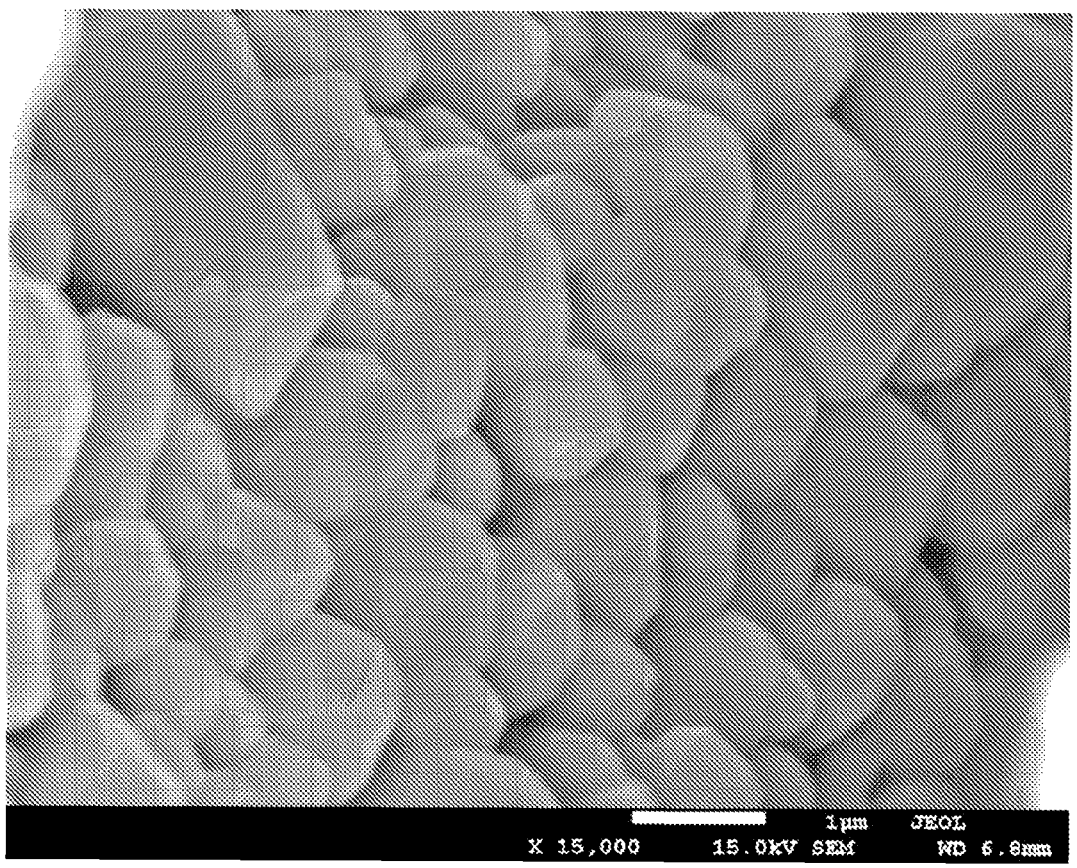
FIG. 1 shows a scanning electron microscope (SEM) image of a thermistor material according to an example of the present disclosure.

Reference will be made in detail to embodiments of the present disclosure; samples of described embodiments are indicated in the drawings. The embodiments described herein with reference to drawings are explanatory, illustrative, and used to generally understand the present disclosure. The embodiments shall not be construed to limit the present disclosure.

For the purpose of the present description and of the following claims, the definitions of the numerical ranges always include the extremes unless otherwise specified.

In addition, terms such as "first" and "second" are used herein for purposes of description and are not intended to indicate or imply relative importance or significance.

It will be understood that the features mentioned above and those still to be explained hereinafter may be used not only in the particular combination specified but also in other combinations or on their own, without departing from the scope of the present invention.

Figure 5:
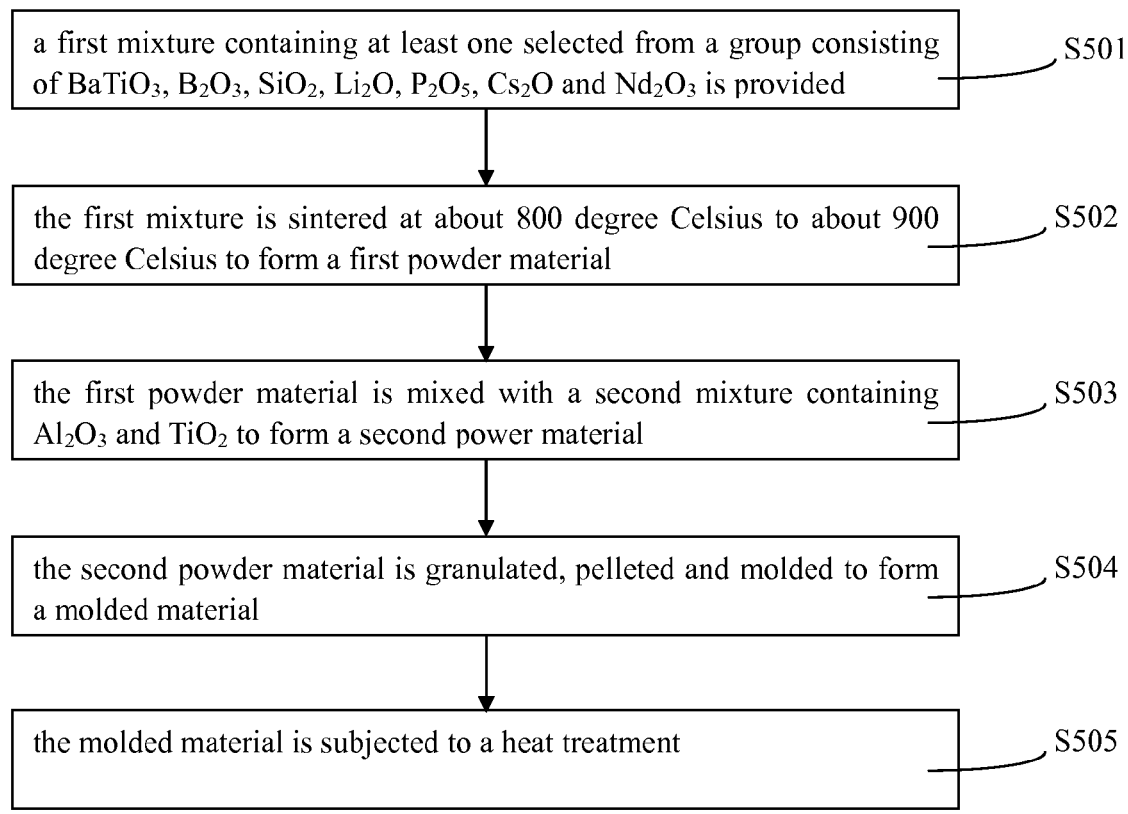
FIG. 5 is a flow chart showing a method for preparing a thermistor material according to an example of the present disclosure.

Embodiments of an aspect of the present disclosure provide a method for preparing a thermistor material. The method may include the following steps s501-505. The method is described in the following with reference to FIG. 5.

Step s501: a first mixture containing $BaTiO_3$, $B_2O_3$, $SiO_2$, $Li_2O$, $P_2O_5$, $Cs_2O$ and $Nd_2O_3$ is provided.

In some embodiments, with respect to 100 weight parts of the first mixture, the amount of $BaTiO_3$ is about 94.85 weight parts to about 97.75 weight parts, the amount of $B_2O_3$ is about 0.4 weight parts to about 2.5 weight parts, the amount of $SiO_2$ is about 0.5 weight parts to about 0.9 weight parts, the amount of $Li_2O$ is about 0.08 weight parts to about 0.2 weight parts, the amount of $P_2O_5$ is about 0.2 weight parts to about 0.3 weight parts, the amount of $Cs_2O$ is about 0.6 weight parts to about 0.725 weight parts, and the amount of $Nd_2O_3$ is about 0.325 weight parts to about 0.565 weight parts.

In some embodiments of the present disclosure, in the step s501, the first mixture may be provided by evenly mixing powders of $BaTiO_3$, $B_2O_3$, $SiO_2$, $Li_2O$, $P_2O_5$, $Cs_2O$ and $Nd_2O_3$. It should be noted that there are no particular limitations for the order of mixing $BaTiO_3$, $B_2O_3$, $SiO_2$, $Li_2O$, $P_2O_5$, $Cs_2O$ and $Nd_2O_3$.

Step s502, the first mixture is sintered at about 800 degree Celsius to about 900 degree Celsius to form a first powder material.

In one embodiment of the present disclosure, the method further includes a step of: subjecting the first mixture to milling prior to the sintering step. There are no particular limitations for methods of the milling in the present disclosure, and the milling may be carried out by employing any commonly apparatus known by those skilled in the art, for example, the milling may be carried out by ball-milling using a planetary ball mill.

In some embodiments of the present disclosure, the step s502 may be carried out for about 100 minutes to about 120 minutes. The temperature of about 800 degree Celsius to about 900 degree Celsius may be achieved with a temperature increasing rate of about 4.2° C./min to about 5.2° C./min.

In one embodiment of the present disclosure, the sintering step may be carried out via a multistage sintering. For example, in one embodiment of the present disclosure, the sintering step includes: a first sintering at about 500 degree Celsius to about 620 degree Celsius, and a second sintering at about 800 degree Celsius to about 900 degree Celsius.

In some embodiments of the present disclosure, the first sintering step is performed for about 50 minutes to about 70 minutes, and the second sintering step is performed for about 60 minutes to about 70 minutes.

In some embodiments, the temperature of about 500 degree Celsius to about 620 degree Celsius in the first sintering step is achieved with a temperature increasing rate of about 4.5° C./h to about 5.0° C./h, and the temperature of about 500 degree Celsius to about 620 degree Celsius in the first sintering step is increased to the about 800 degree Celsius to about 900 degree Celsius in the second sintering step with a temperature increasing rate of about 4.2° C./min to about 5.2° C./min.

Step s503, the first powder material is mixed with a second mixture containing $Al_2O_3$ and $TiO_2$ to form a second power material.

In some embodiments, with respect to 100 weight parts of $BaTiO_3$, the amount of $Al_2O_3$ is about 0.06 weight parts to about 0.08 weight parts, and the amount of $TiO_2$ is about 0.07 weight parts to about 0.08 weight parts.

In some embodiments of the present disclosure, in the step s503, the first powder material is mixed with the second mixture and a sintering additive. In one embodiment, the sintering additive contains an acid silica sol. It should be noted that the acid silica sol may be commercially available. Alternatively, the acid silica sol may be prepared by steps of: mixing ethyl alcohol, water and tetraethyl orthosilicate according to a proportion of 40:4:1 to form a first mixture; stirring the first mixture at 60 degree Celsius with a water bath for 5 hours, while adding 1.1 mol hydrochloric acid into the first mixture during stirring to form a second mixture; and resting the second mixture for 24 hours.

In one embodiment, the sintering additive may be about 0.02 weight parts to about 0.04 weight parts, with respect to 100 weight parts of the first powder material.

Step s504, the second powder material is granulated, pelleted and molded to form a molded material.

In some embodiments, the method further includes a step of subjecting the second power material to milling prior to the granulating step.

In some embodiments of the present disclosure, the granulating step is performed by using an organic binder.

In one embodiment, the organic binder may include a polyvinyl alcohol solution. In some embodiments, the polyvinyl alcohol solution may have a concentration of about 5 wt % to about 6 wt %, such as 5 wt %.

In some embodiments, with respect to 100 weight parts of the second powder material, the polyvinyl alcohol solution is about 0.1 weight parts to about 0.15 weight parts, such as 0.1 weight parts.

In some embodiments of the present disclosure, the granulating step may be carried out via spray granulation. Then performances of the prepared thermistor material may be further improved. In some embodiments of the present disclosure, in the granulating step, the second powder material is granulated into granulated particles having an average diameter of about 200 μm to about 1000 μm.

In some embodiments of the present disclosure, the pelleting step may be carried out under a molding pressure of about 20 MPa to about 30 MPa. Then a compactness of the molded material may be further improved.

Step 505, the molded material is subjected to a heat treatment.

In some embodiments of the present disclosure, the heat treatment may include: a first heat treatment at a first temperature of about 580 degree Celsius to about 600 degree Celsius; a second heat treatment at a second temperature of about 1150 degree Celsius to about 1180 degree Celsius; a third heat treatment at a third temperature of about 1200 degree Celsius to about 1270 degree Celsius; and a fourth heat treatment at a fourth temperature of about 1100 degree Celsius to about 1175 degree Celsius.

In some embodiments, in the first heat treatment the organic binder is removed; in the second heat treatment, a complementary synthesis is performed; in the third heat treatment, a further sintering is performed; and in the fourth heat treatment, an oxidation reaction is performed.

In one embodiment of the present disclosure, the first heat treatment is performed for about 60 minutes to about 120 minutes, the second heat treatment is performed for about 20 minutes to about 40 minutes, the third heat treatment is performed for about 50 minutes to about 70 minutes, and the fourth heat treatment is performed for about 50 minutes to about 70 minutes.

In one embodiment of the present disclosure, the first temperature is achieved with a temperature increasing rate of about 4.0° C./min to about 5.2° C./min, the third temperature is achieved with a temperature increasing rate of about 3.0° C./min to about 10° C./min, and the fourth temperature is achieved with a temperature decreasing rate of about 1.1° C./min to about 3.5° C./min.

In one embodiment of the present disclosure, the heat treatment may further include a fifth heat treatment at about 600 degree Celsius to about 610 degree Celsius for about 90 minutes to about 110 minutes. In one embodiment of the present disclosure, after the fifth treatment, the resulting product is cooled to room temperature.

According to some embodiments of the present disclosure, the method may further include steps of: maintaining at a temperature of about 1125 degree Celsius to about 1250 degree Celsius for about 1 hour to about 1.5 hours; and cooling.

In one embodiment of the present disclosure, the temperature of about 1125 degree Celsius to about 1250 degree Celsius is achieved with a temperature increasing rate of about 250° C./h to about 300° C./h, and the cooling step is performed with a temperature decreasing rate of about 300° C./h to about 350° C./h until the room temperature. Then the performances of the thermistor material may be further improved.

In some embodiments of the present disclosure, $BaTiO_3$ may be commercially available. Alternatively, $BaTiO_3$ may be prepared by a co-precipitation method. In one embodiment, the co-precipitation method may include steps of: mixing a barium salt, a titanate and an oxalic acid solution under a pH of about 2.5 to about 3.5 to form a first solution; subjecting the first solution to co-precipitation to form a titanium barium oxalate precursor; and calcinating the titanium barium oxalate precursor at about 720 degree Celsius to about 820 degree Celsius for about 0.8 hours to about 1.2 hours.

Specifically, the $BaTiO_3$ may be prepared with the following steps. Firstly, a 0.5 mol/L analytically pure barium chloride solution and a 0.5 mol/L oxalic acid solution are prepared by using deionized water respectively. Secondly, 1000 ml the oxalic acid solution is placed in an electronic constant temperature water bath at a temperature of 60 degree Celsius, and then an analytically pure butyl titanate and the barium chloride solution are added into the oxalic acid solution with a feeding speed of 50 ml/min to form a mixed solution, then the mixed solution obtained is stirred by a magnetic stirring apparatus, and the pH of the mixed solution is regulated at 2.5 to 3.5 by an ammonia water. In the mixed solution, the ratio of barium chloride:butyl titanate:oxalic acid is 1:1:2. Thirdly, the resulting solution is subjected to a co-precipitation process for 1 hour to obtain a titanium barium oxalate precursor. Then the titanium barium oxalate precursor is washed and filtered for 4 times to 6 times to remove chloride ions and other impurities, and dried at 100 degree Celsius in an oven. Finally, the dried titanium barium oxalate precursor is calcinated at 800 degree Celsius for 1 hour, thus ultrafine barium titanate powders are obtained.

Specifically, in one embodiment, the method for preparing the thermistor material may be described in details hereinafter.

1) $BaTiO_3$, $B_2O_3$, $SiO_2$, $Li_2O$, $P_2O_5$, $Cs_2O$ and $Nd_2O_3$ are mixed to provide a first mixture, in which with respect to 100 weight parts of the first mixture, the amount of $BaTiO_3$ is 94.85 weight parts to about 97.75 weight parts, the amount of $B_2O_3$ is about 0.4 weight parts to about 2.5 weight parts, the amount of $SiO_2$ is about 0.5 weight parts to about 0.9 weight parts, the amount of $Li_2O$ is about 0.08 weight parts to about 0.2 weight parts, the amount of $P_2O_5$ is about 0.2 weight parts to about 0.3 weight parts, the amount of $Cs_2O$ is about 0.6 weight parts to about 0.725 weight parts, the amount of $Nd_2O_3$ is about 0.325 weight parts to about 0.565 weight parts. Then the first mixture is subjected to a ball-milling for 10 hours with a weight ratio of the first mixture:agate ball:water of 1:2:1. The agate ball has a diameter of 2 mm. Then the milled first mixture is screened with a mesh sieve, such as an 80 mesh sieve, to obtain a first powder material. Generally, the powder material is dried at 80 degree Celsius in an oven.

2) The first powder material is firstly sintered at 620 degree Celsius (achieved with a temperature increasing rate of 5° C./min) for 60 minutes, then the temperature is increased from 620 degree Celsius to 850 degree Celsius with a temperature increasing rate of about 4.5° C./min to about 5.2° C./min and the sintered first powder material is maintained at 850 degree Celsius for about 60 minutes.

3) The powder material resulting from step 2) is mixed with $Al_2O_3$, $TiO_2$ and a sintering additive, in which with respect to 100 weight parts of $BaTiO_3$, $Al_2O_3$ is about 0.06 weight parts to about 0.08 weight parts, $TiO_2$ is about 0.07 weight parts to about 0.08 weight parts, and with respect to 100 weight parts of the powder material resulting from step 2), the sintering additive is about 0.02 weight parts to about 0.04 weight parts to form a second mixture. Then the second mixture is subjected to a ball-milling for 24 hours with a weight ratio of the second mixture:agate ball:water of 1:2:2 to form a second powder material. The agate ball has a diameter of 2 mm. Then the second powder material is dried and screened via a 100 mesh sieve.

4) The powder material resulting from step 3) is granulated together with a polyving akohol (PVA) solution having a concentration of 5 wt % to form a particle material, in which with respect to 100 weight parts of the powder material resulting from step 3), the PVA solution is about 0.1 weight parts. After granulation, the particle material has an average diameter of about 200 μm to about 1000 nm.

5) The particle material resulting from step 5) is pelleted with a predetermined mould under a pressure of about 25 MPa and molded to form a molded material.

6) The temperature within a high temperature sintering furnace is achieved to 600 degree Celsius with a temperature increasing rate of 4.1° C./min, and the molded material is maintained at 600 degree Celsius for 60 minutes to remove the PVA. Then the sintered material is subjected to a heat treatment at 1175 degree Celsius for 40 minutes, during which the complementary synthesis is performed. And then the temperature is quickly increased to 1250 degree Celsius, and the heated material is maintained at 1250 degree Celsius for 60 minutes. Then the temperature is reduced to 1100 degree Celsius with a temperature decreasing rate of about 3.3° C./min, and the resulting material is maintained at 1100 degree Celsius for about 50 minutes, during which the material is oxidized. Then the temperature is reduced to 600 degree Celsius and maintained for about 50 minutes, and reduced to 200 degree Celsius. Finally the resulted material is cooled to room temperature naturally.

7) The temperature is increased from room temperature to 1125 degree Celsius with a temperature increasing rate of about 4.2° C./min to about 5° C./min, and the material resulting from step 6) is maintained at 1125 degree Celsius for 60 minutes.

Embodiments of another aspect of the present disclosure provide a thermistor material. The thermistor material may be prepared by the method mentioned above. It to be noted that, the thermistor material has high positive temperature coefficient, thus the thermistor material may also be referred as positive temperature coefficient (PTC) thermistor material.

Embodiments of a further aspect of the present disclosure provide a thermistor material. The thermistor material may be prepared by mixing and heating a mixture, the mixture may contain $BaTiO_3$, $B_2O_3$, $SiO_2$, $Li_2O$, $P_2O_5$, $Cs_2O$, $Nd_2O_3$, $Al_2O_3$ and $TiO_2$.

In some embodiments of the present disclosure, with respect to 100 weight parts of $BaTiO_3$, the amount of $B_2O_3$ is about 1.05 weight parts to about 2.64 weight parts, the amount of $SiO_2$ is about 0.52 weight parts to about 0.94 weight parts, the amount of $Li_2O$ is about 0.084 weight parts to about 0.21 weight parts, the amount of $P_2O_5$ is about 0.21 weight parts to about 0.32 weight parts, the amount of $Cs_2O$ is about 0.63 weight parts to about 0.764 weight parts, the amount of $Nd_2O_3$ is about 0.343 weight parts to about 0.596 weight parts, the amount of $Al_2O_3$ is about 0.06 weight parts to about 0.08 weight parts, and the amount of $TiO_2$ is about 0.04 weight parts to about 0.08 weight parts.

In some other embodiments of the present disclosure, with respect to 100 weight parts of $BaTiO_3$, the amount of $B_2O_3$ is about 1.08 weight parts to about 2.60 weight parts, the amount of $SiO_2$ is about 0.55 weight parts to about 0.90 weight parts, the amount of $Li_2O$ is about 0.088 weight parts to about 0.20 weight parts, the amount of $P_2O_5$ is about 0.25 weight parts to about 0.30 weight parts, the amount of $Cs_2O$ is about 0.65 weight parts to about 0.75 weight parts, the amount of $Nd_2O_3$ is about 0.35 weight parts to about 0.55 weight parts, the amount of $Al_2O_3$ is about 0.06 weight parts to about 0.08 weight parts, and the amount of $TiO_2$ is about 0.04 weight parts to about 0.08 weight parts.

In some embodiments of the present disclosure, with respect to 100 weight parts of $BaTiO_3$, the amount of $B_2O_3$ is about 1.10 weight parts to about 2.60 weight parts, the amount of $SiO_2$ is about 0.55 weight parts to about 0.88 weight parts, the amount of $Li_2O$ is about 0.1 weight parts to about 0.20 weight parts, the amount of $P_2O_5$ is about 0.28 weight parts to about 0.30 weight parts, the amount of $Cs_2O$ is about 0.68 weight parts to about 0.75 weight parts, the amount of $Nd_2O_3$ is about 0.36 weight parts to about 0.5 weight parts, the amount of $Al_2O_3$ is about 0.06 weight parts to about 0.08 weight parts, and the amount of $TiO_2$ is about 0.04 weight parts to about 0.08 weight parts.

The present disclosure will be described in details with reference to the following examples.

EXAMPLE 1

1) Preparing $BaTiO_3$

1a) A barium chloride solution having a concentration of 0.5 mol/L was prepared by using an analytically pure barium chloride and deionized water, and an oxalic acid solution having a concentration of 1.0 mol/L was prepared by using an oxalic acid and deionized water.

1b) 1000 ml the oxalic acid solution was placed in an electronic constant temperature water bath at a temperature of 60 degree Celsius, and then the barium chloride solution and an analytically pure butyl titanate were added into the oxalic acid solution at a feeding speed of 50 ml/min to form a mixed solution, in which a ratio of barium chloride:butyl titanate:oxalic acid was 1:1:2. Then the mixed solution obtained was stirred by a magnetic stirring apparatus and the pH of the mixed solution was regulated at about 2.5 to about 3.5 by ammonia water.

1c) The mixed solution resulting from step b1) was subjected to a co-precipitation process for about 1 hour with a magnetic stirring apparatus to obtain a titanium barium oxalate precursor. Then the titanium barium oxalate precursor was washed and filtered for 5 times to remove chloride ions and other impurities, and the filtered precursor was dried at 100 degree Celsius in an oven.

1d) Finally, the precursor resulting from step c1) was calcinated at 800 degree Celsius for 60 minutes to obtain an ultrafine barium titanate ($BaTiO_3$) powder.

2) Preparing Thermistor Material

2a) The $BaTiO_3$ powder resulting from step 1d) was mixed with analytically pure oxide mixtures to form a first mixture, in which with respect to 100 weight parts of the first mixture, the first mixture contained 96.65 weight parts of $BaTiO_3$, 1.3 weight parts of $B_2O_3$, 0.7 weight parts of $SiO_2$, 0.1 weight parts of $Li_2O$, 0.25 weight parts of $P_2O_5$, 0.625 weight parts of $Cs_2O$, and 0.375 weight parts of $Nd_2O_3$. Then the first mixture was subjected to a ball-milling for 10 hours with a weight ratio of the first mixture:agate ball:water of 1:2:1, and the agate ball had a diameter of 2 mm.

2b) The milled first mixture resulting from step 2a) was screened via an 80 mesh sieve and dried at 80 degree Celsius in an oven.

2c) The material resulting from step 2b) was firstly sintered at 620 degree Celsius for 2 hours, and the temperature of 620 degree Celsius was achieved with a temperature increasing rate of 5° C./min. And then the firstly sintered material was sintered at 850 degree Celsius for about 2 hours, and the temperature of 850 degree Celsius was achieved with a temperature increasing rate of 5° C./min, thus forming a first powder material.

2d) An ethyl alcohol, water and an tetraethyl orthosilicate were mixed according to a weight ratio of ethyl alcohol:water:tetraethyl orthosilicate of 40:4:1, then heated at 60 degree Celsius for 5 hours under a magnetic stirring. During the stirring, 1.1 mol hydrochloric acid was added. Then the resulting solution was rested for 24 hours to obtain an acid silica sol.

2e) 0.061 g $Al_2O_3$, 0.074 g of $TiO_2$ and 0.056 g acid silica sol were added into the first powder material to form a second mixture. Then the second mixture was subjected to a ball-milling for 24 hours with a weight ratio of the second mixture:agate ball:water being 1:2:2 to form a second powder material. The agate ball had a diameter of 2 mm.

2f) Then the second powder material was dried and screened via a 100 mesh sieve.

2g) The powder material resulting from step 2f) was spray granulated together with 5 wt % PVA solution to form a particle material. With respect to 100 weight parts of the resulting second powder material, the PVA solution was 0.1 weight parts. The particle material had an average diameter of 200 μm to 300 μm.

2h) The particle material was pelleted and molded under a pressure of 20 MPa with a predetermined mould to form a molded material.

2i) The molded material was sintered in a high temperature sintering furnace for 120 minutes at 600 degree Celsius which was achieved with a temperature increasing rate of 4.1° C./min to remove the PVA. Then the sintered material was subjected to a heat treatment at 1175 degree Celsius for 40 minutes, during which the complementary synthesis was conducted. And then the temperature was increased to 1250 degree Celsius with a temperature increasing rate of 10° C./min, and the resulting material was maintained at 1250 degree Celsius for 20 minutes. Then the temperature was reduced to 1100 degree Celsius with a temperature decreasing rate of about 3.3° C./min and the resulting material was maintained at 1100 degree Celsius for 50 minutes, during which the resulting material was oxidized completely. The temperature was reduced to 200 degree Celsius, and decreased to room temperature naturally.

2j) The temperature was increased from room temperature to 1125 degree Celsius with a temperature increasing rate of 4.7° C./min, and the resulting material is maintained at 1125 degree Celsius for 60 minutes to obtain a PTC thermistor material sample S1.

Then the sample S1 was tested with a field emission scanning electron microscopy and an energy disperse spectroscopy (FESEM/EDS), and the scanning electron microscopy (SEM) image of the sample S1 is shown in FIG. 1.

EXAMPLE 2

The method for preparing a PTC thermistor material sample S2 of Example 2 included substantially the same steps as Example 1, except the following differences: in the step 2i), the molded material was sintered for 100 minutes in a high temperature sintering furnace at 600 degree Celsius which was achieved with a temperature increasing rate of 5° C./min to remove the PVA; the sintered material was subjected to a heat treatment at 1150 degree Celsius for 40 minutes, during which the complementary synthesis was conducted; and then the temperature was increased to 1225 degree Celsius with a temperature increasing rate of 8° C./min, and the resulting material was maintained at 1225 degree Celsius for 70 minutes; then the temperature was reduced to 1100 degree Celsius with a temperature decreasing rate of about 2.3° C./min and the resulting material was maintained at 1100 degree Celsius for 50 minutes, during which the resulting material was oxidized completely; and the temperature was reduced to 200 degree Celsius, and decreased to room temperature naturally.

Figure 2:
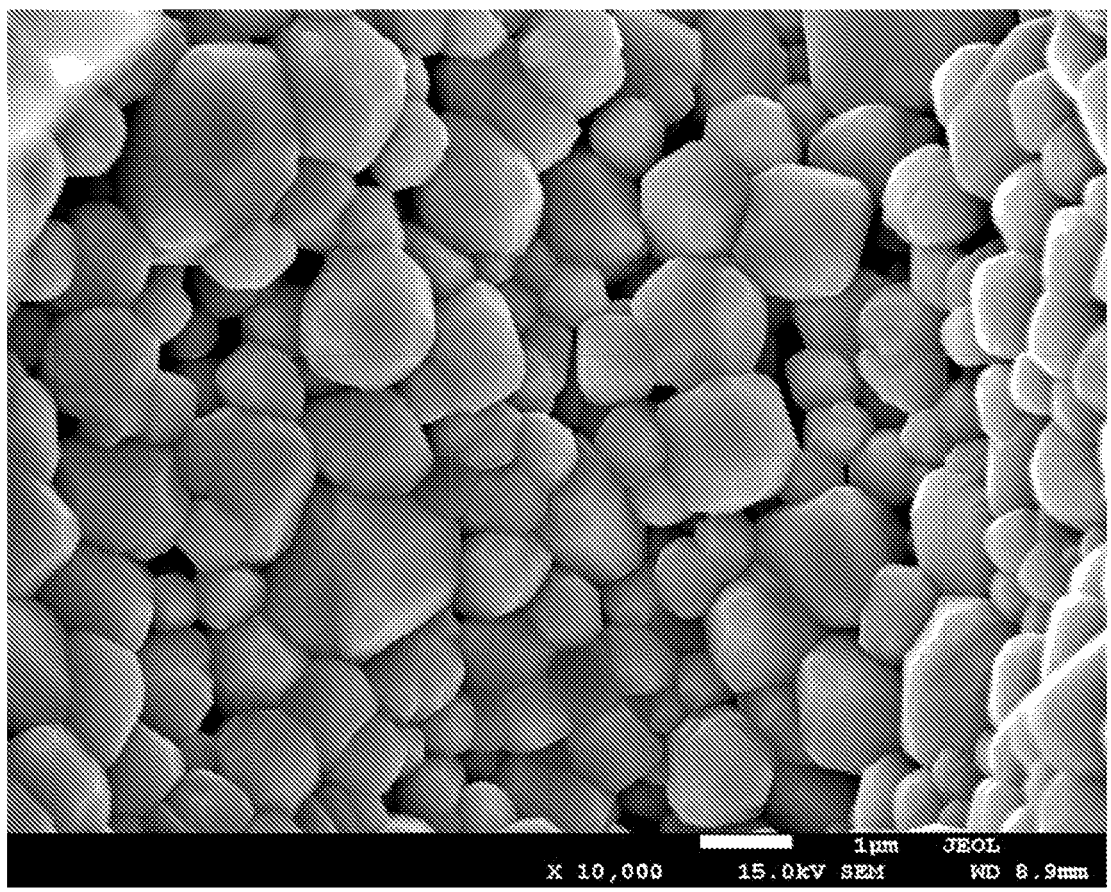
FIG. 2 shows a scanning electron microscope (SEM) image of a thermistor material according to another example of the present disclosure.

Then the sample S2 was tested with FESEM/EDS, and the SEM image of the sample S2 is shown in FIG. 2.

EXAMPLE 3

The method for preparing a PTC thermistor material sample S3 of Example 3 included substantially the same steps as Example 1, except the following differences: in the step 2a), with respect to 100 weight parts of the first mixture, the first mixture contained 94.85 weight parts of $BaTiO_3$, 2.5 weight parts of $B_2O_3$, 0.87 weight parts of $SiO_2$, 0.20 weight parts of $Li_2O$, 0.30 weight parts of $P_2O_5$, 0.725 weight parts of $Cs_2O$, and 0.555 weight parts of $Nd_2O_3$; then the first mixture was subjected to a ball-milling for 10 hours with a weight ratio of the first mixture:agate ball:water of 1:2:1, and the agate ball had a diameter of 2 mm.

Figure 3:
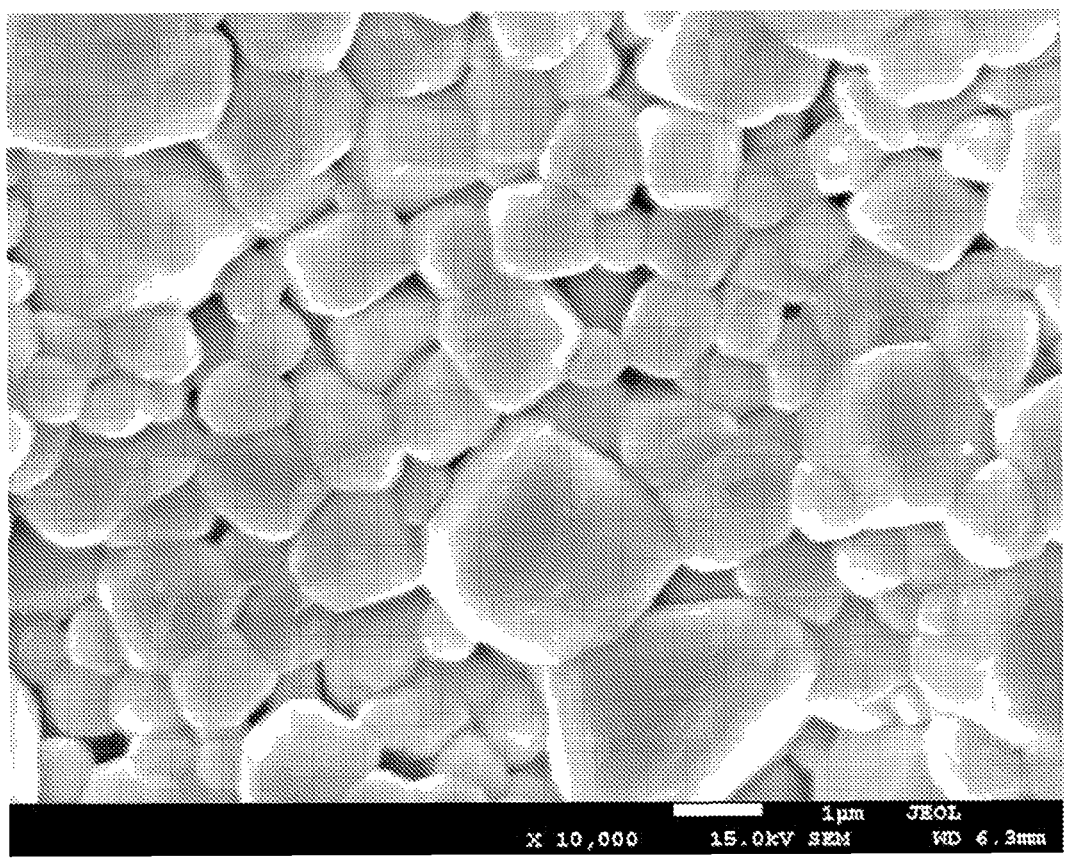
FIG. 3 shows a scanning electron microscope (SEM) image of a thermistor material according to still another example of the present disclosure.

Then the sample S3 was tested with FESEM/EDS, and the SEM image of the sample S3 is shown in FIG. 3.

EXAMPLE 4

The method for preparing a PTC thermistor material sample S4 of Example 4 included substantially the same steps as Example 1, except the following differences: in the step 2a), with respect to 100 weight parts of the first mixture, the first mixture contained 94.92 weight parts of $BaTiO_3$, 2.44 weight parts of $B_2O_3$, 0.9 weight parts of $SiO_2$, 0.20 weight parts of $Li_2O$, 0.28 weight parts of $P_2O_5$, 0.705 weight parts of $Cs_2O$, and 0.558 weight parts of $Nd_2O_3$; then the first mixture was subjected to a ball-milling for 10 hours with a weight ratio of the first mixture:agate ball:water of 1:2:1, and the agate ball had a diameter of 2 mm.

EXAMPLE 5

The method for preparing a PTC thermistor material sample S5 of Example 5 included substantially the same steps as Example 1, except the following differences: in the step 2a), with respect to 100 weight parts of the first mixture, the first mixture contained 96.65 weight parts of $BaTiO_3$, 1.6 weight parts of $B_2O_3$, 0.5 weight parts of $SiO_2$, 0.08 weight parts of $Li_2O$, 0.20 weight parts of $P_2O_5$, 0.605 weight parts of $Cs_2O$, and 0.365 weight parts of $Nd_2O_3$; then the first mixture was subjected to a ball-milling for 10 hours with a weight ratio of the first mixture:agate ball:water of 1:2:1, and the agate ball had a diameter of 2 mm.

EXAMPLE 6

The method for preparing a PTC thermistor material sample S6 of Example 6 included substantially the same steps as Example 1, except the following differences: in the step 2a), with respect to 100 weight parts of the first mixture, the first mixture contained 96.65 weight parts of $BaTiO_3$, 1.0 weight parts of $B_2O_3$, 0.8 weight parts of $SiO_2$, 0.2 weight parts of $Li_2O$, 0.30 weight parts of $P_2O_5$, 0.675 weight parts of $Cs_2O$, and 0.375 weight parts of $Nd_2O_3$; then the first mixture was subjected to a ball-milling for 10 hours with a weight ratio of the first mixture:agate ball:water of 1:2:1, and the agate ball had a diameter of 2 mm.

EXAMPLE 7

The method for preparing a PTC thermistor material sample S7 of Example 3 included substantially the same steps as Example 1, except the following differences: in the step 2c), the material resulting from step 2b) was firstly sintered at 850 degree Celsius for 2 hours, and the temperature of 850 degree Celsius was achieved with a temperature increasing rate of 5° C./min.

EXAMPLE 8

The method for preparing a PTC thermistor material sample S8 of Example 8 included substantially the same steps as Example 1, except the following differences: in the step 2g), the powder material resulting from step 2f) was annually granulated together with 5 wt % PVA solution to form a particle material, and with respect to 100 weight parts of the resulting second powder material, the PVA solution was 0.2 weight parts, and the particle material had an average diameter of 400 μm to 600 μm.

EXAMPLE 9

The method for preparing a PTC thermistor material sample S8 of Example 8 included substantially the same steps as Example 1, except the following differences: in the step 2h), the particle material was pelleted and molded under a pressure of 30 MPa with a predetermined mould to form a molded material.

COMPARATIVE EXAMPLE 1

$BaTiO_3$ powder and analytically pure oxide mixtures were mixed to form a first mixture, in which with respect to 100 weight parts of the first mixture, the first mixture contained 45.72 weight parts of $BaCO_3$, 27.70 weight parts of $TiO_2$, 0.49 weight parts of $SiO_2$, 25.49 weight parts of $Pb_3O_4$, 0.024 weight parts of $Mn(NO_3)_2$, 0.07 weight parts of $Al_2O_3$, and 0.5 weight parts of $Nd_2O_5$. Then the first mixture was subjected to a ball-milling for 7 hours with a weight ratio of the first mixture:agate ball:water of 1:2:2, and the agate ball had a diameter of 2 mm.

Then the first mixture was screened via a 100 mesh sieve and dried at 80 degree Celsius in an oven to obtain a first powder material. Then the first powder material was firstly sintered for 140 minutes at 600 degree Celsius which was achieved with a temperature increasing rate of 4.5° C./min, then sintered for 60 minutes at 965 degree Celsius which was achieved with a temperature increasing rate of 4.5° C./min.

An ethyl alcohol, water and an tetraethyl orthosilicate were mixed according to a weight ratio of ethyl alcohol:water:tetraethyl orthosilicate of 40:4:1, then heated at 60 degree Celsius for 5 hours under a magnetic stirring. During the stirring, 1.1 mol hydrochloric acid was added. Then the resulting solution was rested for 24 hours to obtain an acid silica sol.

0.028 g Mn and 0.042 g acid silica sol were added into the first powder material to form a second mixture. Then the second mixture was subjected to a ball-milling for 7 hours with a weight ratio of the second mixture:agate ball:water of 1:2:1 to form a second powder material. The agate ball had a diameter of 2 mm.

Then the second powder material was dried and screened via a 100 mesh sieve.

Then the resulting powder material was spray granulated together with 5 wt % PVA solution to form a particle material. With respect to 100 weight parts of the resulting powder material, the PVA solution was 0.2 weight parts. The particle material had an average diameter of 800 μm to 900 μm.

The particle material was pelleted and molded under a pressure of 25 MPa with a predetermined mould to form a molded material.

Then, the molded material was sintered in a high temperature sintering furnace for 120 minutes at 600 degree Celsius which was achieved with a temperature increasing rate of 5° C./min. Then the sintered material was maintained at 900 degree Celsius for 70 minutes, maintained at 1180 degree Celsius for 30 minutes, maintained at 1260 degree Celsius for 60 minutes, and maintained at 1175 degree Celsius for 60 minutes. The temperature was reduced to 600 degree Celsius, and the resulting material was maintained at 600 degree Celsius for 100 minutes, and then cooled to room temperature.

Figure 4:
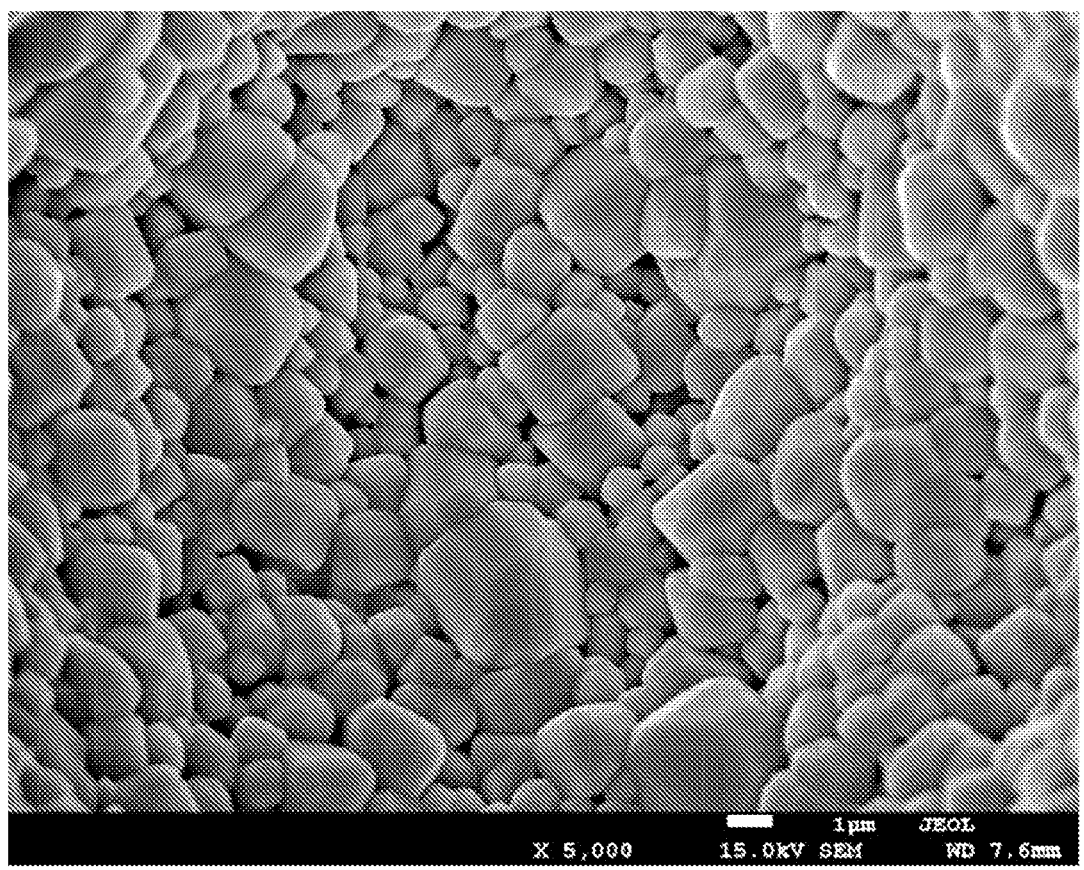
FIG. 4 shows a scanning electron microscope (SEM) image of a thermistor material according to yet another example of the present disclosure.

After that, the temperature was increased from 0 degree Celsius to 550 degree Celsius within 110 minutes, and the resulting material was maintained at 550 degree Celsius for 30 minutes, then the temperature was increased to 1200 degree Celsius within 130 minutes and the resulting material was maintained at 1200 degree Celsius for 80 minutes, and then the temperature was decreased to 550 degree Celsius within 130 minutes and the resulting material was maintained at 550 degree Celsius for 50 mi Then the sample DS1 was tested with FESEM/EDS, and the SEM image of the sample DS1 is shown in FIG. 4.

Tests

1) Impedance

These samples S1-S9 and DS1 were tested by a 6510B precision impedance analyzer produced by Wayne Kerr, under a testing frequency of 20 Hz to 10 MHz. The results are shown in Table 1.

2) Ambient Resistance

These samples S1-S9 and DS1 were tested by a universal meter at room temperature. The results are shown in Table 1.

3) Curie Temperature

Resistance of these samples S1-S9 and DS1 were tested by a universal meter respectively, the temperature corresponding to the maximum resistance of each of these samples was recorded as the curie temperature of each sample. The results are shown in Table 1.

4) Lift-to-Drag Ratio

The lift-to-drag ratio is calculated as the resistance at curie temperature divided by the resistance at room temperature. The lift-to-drag ratios of these samples S1-S9 and DS1 are recorded in Table 1.

5) Breakdown Voltage

Breakdown voltages of these samples S1-S9 and DS1 were tested by a BYD-GN-02 breakdown voltage tester. The results are recorded in Table 1.

TABLE 1

|  | Grain resistance ($\Omega$) | Grain boundary resistance (K$\Omega$) | Room Temperature Resistance | Curie temperature | Resistance jump | Puncture voltage (Volts) |
| --- | --- | --- | --- | --- | --- | --- |
| S1 | 3.11 | 2 | 5.4 | 204 | 6.6 | 1050 |
| S2 | 10.1 | 28 | 18 | 200 | 6.2 | 1018 |
| S3 | 50 | 101 | 17 | 201 | 6.0 | 960 |
| S4 | 20 | 23.2 | 27 | 198 | 5.8 | 987 |
| S5 | 19 | 24 | 21 | 212 | 6.3 | 1012 |
| S6 | 3.45 | 4.65 | 5.7 | 192 | 6.2 | 1008 |
| S7 | 14.3 | 12 | 11 | 202 | 5.7 | 923 |
| S8 | 11.2 | 19.7 | 23 | 191 | 5.4 | 956 |
| S9 | 10.2 | 27.8 | 18 | 187 | 5.9 | 943 |
| DS1 | 125 | 2000 | 91 | 192 | 5.3 | 812 |

As shown in Table 1, the working voltage of the thermistor material may be higher than 400 Volts, the breakdown voltage the thermistor material may reach 900 Volts, the curie temperature of the thermistor material may be about 200 degree Celsius, and the lift-to-drag ratio of the thermistor material may be larger than 6.

It can be concluded from Table 1, the thermistor material according to embodiments of the present disclosure has a high curie temperature and a high breakdown voltage. Further, the ambient resistance of the thermistor material is significantly reduced (which may be less then twenty Ohm, as shown in Table 1), and the lift-to-drag ratio of the thermistor material is high. In addition, the grain resistance and the grain boundary resistance of the thermistor are lower. The method for preparing the thermistor material according to embodiments of the present disclosure is easy to operate low in cost. Further, the sintering requirements of the method is easy to meet, thus the yield and consistency of products are improved. In this way, the thermistor material may have better performances and may be applied in poorer environment, such as in the high temperature and high voltage condition.

Although explanatory Examples have been shown and described, it would be appreciated by those skilled in the art that the above Examples can not be construed to limit the present disclosure, and changes, alternatives, and modifications can be made in the Examples without departing from spirit, principles and scope of the present disclosure.

What is claimed is:

1. A method for preparing a thermistor material, comprising steps of:

providing a first mixture comprising $BaTiO_3$, $B_2O_3$, $SiO_2$, $Li_2O$, $P_2O_5$, $Cs_2O$ and $Nd_2O_3$, wherein with respect to 100 weight parts of the first mixture, $BaTiO_3$ is about 94.85 weight parts to about 97.75 weight parts, $B_2O_3$ is about 0.4 weight parts to about 2.5 weight parts, $SiO_2$ is about 0.5 weight parts to about 0.9 weight parts, $Li_2O$ is about 0.08 weight parts to about 0.2 weight parts, $P_2O_5$ is about 0.2 weight parts to about 0.3 weight parts, $Cs_2O$ is about 0.6 weight parts to about 0.725 weight parts, and $Nd_2O_3$ is about 0.325 weight parts to about 0.565 weight parts;

sintering the first mixture at about 800 degree Celsius to about 900 degree Celsius to form a first powder material;

mixing the first powder material with a second mixture comprising $Al_2O_3$ and $TiO_2$, wherein with respect to 100 weight parts of $BaTiO_3$, $Al_2O_3$ is about 0.06 weight parts to about 0.08 weight parts, and $TiO_2$ is about 0.07 weight parts to about 0.08 weight parts to form a second power material;

granulating, pelleting and molding the second powder material to form a molded material; and subjecting the molded material to a heat treatment.

2. The method of claim 1, further comprising:

subjecting the first mixture to milling prior to the sintering step, and subjecting the second power material to milling prior to the granulating step.

3. The method of claim 1, wherein in the mixing step, the first powder material is mixed with the second mixture and a sintering additive.

4. The method of claim 3, wherein the sintering additive comprises an acid silica sol.

5. The method of claim 1, wherein the granulating step is performed by using an organic binder.

6. The method of claim 5, wherein the organic binder comprises a polyvinyl alcohol solution having a concentration of about 5 wt % to about 6 wt %, and with respect to 100 weight parts of the second powder material, the polyvinyl alcohol solution is about 0.1 weight parts to about 0.2 weight parts.

7. The method of claim 1, wherein the heat treatment comprises:

a first heat treatment at a first temperature of about 580 degree Celsius to about 600 degree Celsius;

a second heat treatment at a second temperature of about 1150 degree Celsius to about 1180 degree Celsius;

a third heat treatment at a third temperature of about 1200 degree Celsius to about 1270 degree Celsius; and a fourth heat treatment at a fourth temperature of about 1100 degree Celsius to about 1175 degree Celsius.

8. The method of claim 7, wherein the first heat treatment is performed for about 60 minutes to about 120 minutes, the second heat treatment is performed for about 20 minutes to about 40 minutes, the third heat treatment is performed for about 50 minutes to about 70 minutes, and the fourth heat treatment is performed for about 50 minutes to about 70 minutes.

9. The method of claim 7, wherein the first temperature is achieved with a temperature increasing rate of about 4.0° C./min to about 5.2° C./min, the third temperature is achieved with a temperature increasing rate of about 3.0° C./min to about 10° C./min, and the fourth temperature is achieved with a temperature decreasing rate of about 1.1° C./min to about 3.5° C./min.

10. The method of claim 7, wherein the heat treatment further comprises:

a fifth heat treatment at about 600 degree Celsius to about 610 degree Celsius for about 90 minutes to about 110 minutes.

11. The method of claim 1, wherein the sintering step comprises:

a first sintering at a fifth temperature of about 500 degree Celsius to about 620 degree Celsius, and a second sintering at a sixth temperature of about 800 degree Celsius to about 900 degree Celsius.

12. The method of claim 11, wherein the first sintering step is performed for about 50 minutes to about 70 minutes, the second sintering step is performed for about 60 minutes to about 70 minutes, and the fifth temperature is increased to the sixth temperature with a temperature increasing rate of about 4.2° C./min to about 5.2° C./min.

13. The method of claim 1, wherein the granulating step is carried out via spray granulation, and in the granulating step, the second powder material is granulated into granulated particles having an average diameter of about 200 μm to about 1000 μm.

14. The method of claim 1, wherein the pelleting step is carried out under a pressure of about 20 MPa to about 30 MPa.

15. The method of claim 1, further comprising steps of:

maintaining at a seventh temperature of about 1125 degree Celsius to about 1250 degree Celsius for about 1 hour to about 1.5 hours; and cooling.

16. The method of claim 15, wherein the seventh temperature is achieved with a temperature increasing rate of about 250° C./h to about 300° C./h, and the cooling step is performed with a temperature decreasing rate of about 300° C./h to about 350° C./h.

17. The method of claim 1, wherein the $BaTiO_3$ is prepared by steps of:

mixing a barium salt, a titanate and an oxalic acid solution under a pH of about 2.5 to about 3.5 to form a first solution;

subjecting the first solution to co-precipitation to form a titanium barium oxalate precursor; and calcinating the titanium barium oxalate precursor at about 720 degree Celsius to about 820 degree Celsius for about 0.8 hours to about 1.2 hours.

18. A thermistor material prepared by mixing and heating a mixture, wherein the mixture comprises $BaTiO_3$, $B_2O_3$, $SiO_2$, $Li_2O$, $P_2O_5$, $Cs_2O$, $Nd_2O_3$, $Al_2O_3$ and $TiO_2$, wherein with respect to 100 weight parts of $BaTiO_3$, $B_2O_3$ is about 1.05 weight parts to about 2.64 weight parts, $SiO_2$ is about 0.52 weight parts to about 0.94 weight parts, $Li_2O$ is about 0.084 weight parts to about 0.21 weight parts, $P_2O_5$ is about 0.21 weight parts to about 0.32 weight parts, $Cs_2O$ is about 0.63 weight parts to about 0.764 weight parts, $Nd_2O_3$ is about 0.343 weight parts to about 0.596 weight parts, $Al_2O_3$ is about 0.06 weight parts to about 0.08 weight parts, and $TiO_2$ is about 0.04 weight parts to about 0.08 weight parts.

19. The thermistor material of claim 18, wherein with respect to 100 weight parts of $BaTiO_3$, $B_2O_3$ is about 1.08 weight parts to about 2.60 weight parts, $SiO_2$ is about 0.55 weight parts to about 0.90 weight parts, $Li_2O$ is about 0.088 weight parts to about 0.20 weight parts, $P_2O_5$ is about 0.25 weight parts to about 0.30 weight parts, $Cs_2O$ is about 0.65 weight parts to about 0.75 weight parts, $Nd_2O_3$ is about 0.35 weight parts to about 0.55 weight parts, $Al_2O_3$ is about 0.06 weight parts to about 0.08 weight parts, and $TiO_2$ is about 0.04 weight parts to about 0.08 weight parts.

* * * * *